Nov. 4, 1969

H. SCHANZ 3,476,398

SEAL ASSEMBLY

Filed Jan. 24, 1967

INVENTOR.
HANS SCHANZ
BY
Karl J. Ross
ATTORNEY.

United States Patent Office 3,476,398
Patented Nov. 4, 1969

3,476,398
SEAL ASSEMBLY
Hans Schanz, Gifhorn, Germany, assignor to Alfred Teves Maschinen- und Armaturenfabrik KG, Frankfurt am Main, Germany, a corporation of Germany
Filed Jan. 24, 1967, Ser. No. 611,291
Claims priority, application Germany, Feb. 23, 1966, T 30,516
Int. Cl. F16j *9/00, 15/56*
U.S. Cl. 277—162                5 Claims

ABSTRACT OF THE DISCLOSURE

A seal assembly, especially for securing a dust sleeve or other elastic sealing member to a piston or cylinder, wherein either the piston member or the cylinder member is formed with a groove open outwardly and receiving a flange of the membrane, a split clamping ring being received in the groove and having an edge (formed between two surfaces including an acute angle) held against this flank of the groove by a multiplicity of resiliently compressed protuberances formed on the sleeve. The split clamping ring may have an inner or outer frustoconical surface including the aforementioned acute angle between itself and another surface of the ring.

---

My present invention relates to an assembly for retaining an elastic member against a rigid member and, more particularly, to a sealing arrangement for relatively movable parts such as annular telescoping elements of a piston-and-cylinder arrangement.

While many techniques for securing annular sealing membranes, e.g. dust sleeves, caps or the like, to rigid annular members have been proposed, it is most common merely to exploit the inherent resiliency of the cap or sleeve and to permit a flange or lip of the latter to hug an annular surface of the rigid members. To retain the cap in place, the rigid member, e.g. the piston or cylinder, may be formed with a circumferential outwardly open groove in which an annular flange of the seal is seated. These arrangements have, however, the significant disadvantage that the elasticity or resiliency of the sleeve decreases with time and the self-clamping action thereof tends toward relaxation. To avoid the disadvantages arising from such loosening of the sleeve, it has been the practice to provide the groove with an overhanging portion, a threaded clamping nut or the like, such systems being relatively complicated and difficult to remove after some time.

It is the principal object of the present invention, therefore, to provide an improved seal assembly whereby the aforementioned disadvantages can be avoided.

Another object of this invention is to provide a relatively inexpensive, simple and effective clamping arrangement for annular flexible membranes adapted to be affixed to annular rigid members.

A further object of my invention is to provide a system for sealingly interconnecting a piston member and a cylinder member with freedom of relative axial movement.

These objects and others which will become apparent hereinafter are attained, in accordance with this invention, by a sealing assembly in which a rigid member is provided with an outwardly open groove receiving a flange of the flexible membrane against a flank of this groove, a clamping member being received within this groove and having an acute-angle edge urged against the other flank of the groove by a multiplicity of protuberant formations unitary with the membrane and held under elastic compression between the other flank and the clamping member. Advantageously, the rigid member is one of the relatively movable elements of a piston-and-cylinder arrangement and the groove is an outwardly open annular recess formed in this element. The flexible resilient membrane (e.g. composed of a fabric-reinforced or nonreinforced elastomeric material, for instance, rubber), is constituted as a dust-excluding cap, cuff or sleeve and has protuberances formed integrally thereon in peripherally spaced relationship along an annular flange receivable in this groove. Furthermore, the flange may have an outwardly projecting portion underlying the clamping members held by the clamping pressure against the floor of the groove.

According to a further feature of this invention, the clamping member is a split ring having a frustoconical inner and outer surface defining the acute angle with another surface of the ring so that the ring generally is of trapezoidal cross-section with an acute angle adapted to bite into an exposed flank of the groove. I have found, surprisingly, that once such a ring is fitted in the groove and urged thereagainst by the resilient compression of the spaced-apart protuberances, the acute-angle edge tends to lodge tightly against the exposed flank and lock the assembly against loosening even under severe vibrational stress and after lapse of such periods of time well-known to detrimentally affect the elasticity of the cap portion of similar sleeves. I believe this effect is due to the "biting action" mentioned earlier which precludes unintentional withdrawal of the clamping ring once it has remained in place for some time.

The above and other objects, features and advantages of the present invention will become more readily apparent in the following description, reference being made to the accompanying drawing in which.

Figure 1:
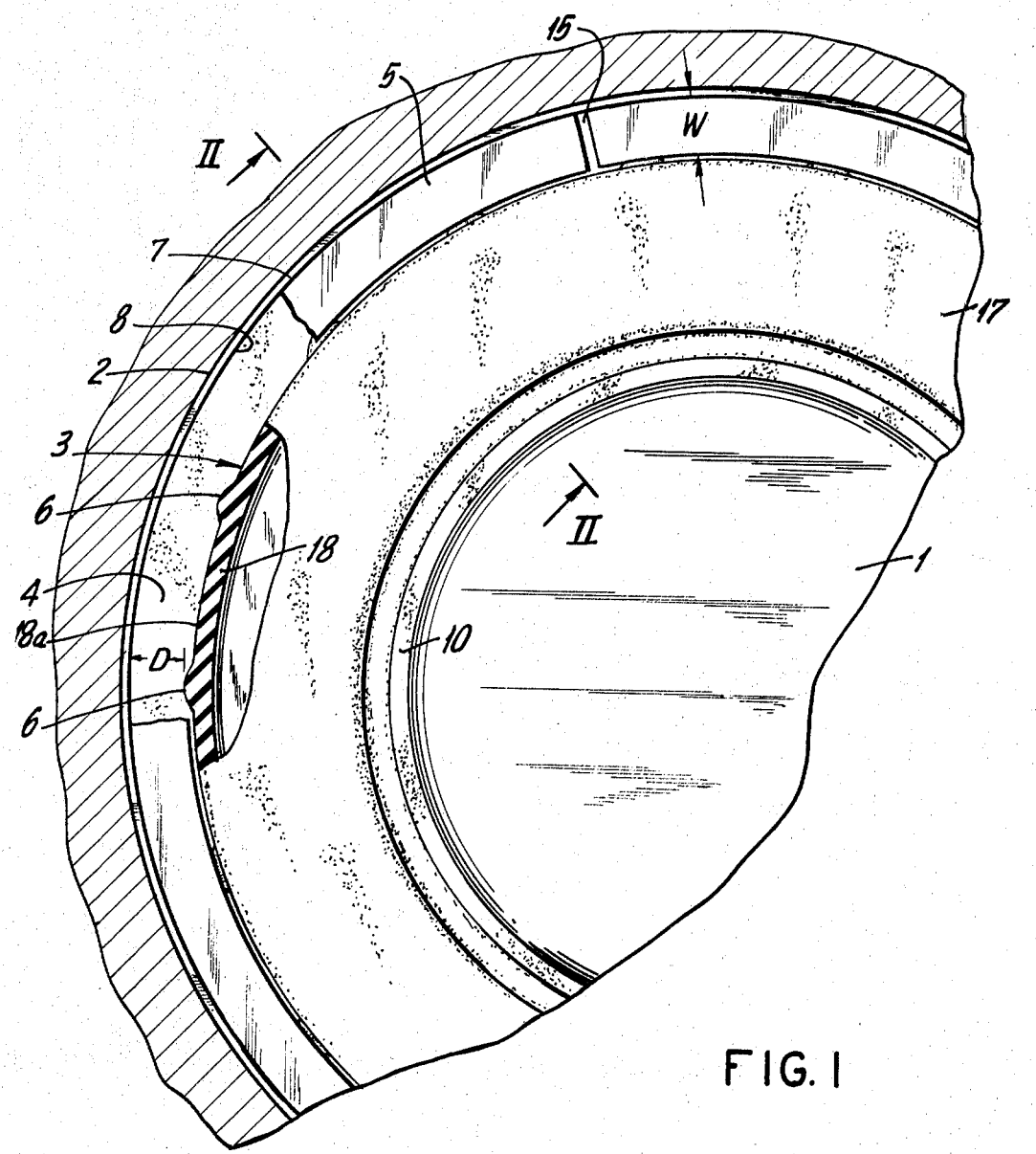
FIG. 1 is a fragmentary end view, partly broken away, of a piston-and-cylinder arrangement having a dust cap in accordance with the present invention.
Figure 2:
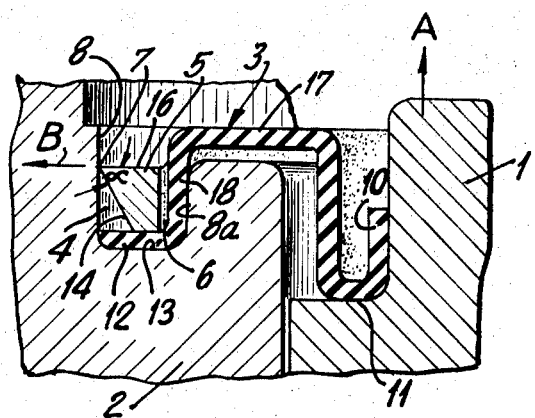
FIG. 2 is a cross-sectional view taken generally along the line II—II of FIG. 1.

In FIGS. 1 and 2 of the drawing, I show a piston 1 reciprocable within a cylinder housing 2 of, for example, a disk or drum type automotive-vehicle brake provided with a dust-excluding sealing membrane in the form of a dust cap or sleeve 3. The assembly comprises, according to this invention, an outwardly axially open groove 4 in the housing or cylinder 2 which is formed with a pair of axially extending flanks 8 and 8a as well as a floor 13 transverse to the axis of reciprocation of the piston 1.

The dust cap 3 is provided with an annular flange 18 parallel to the direction of reciprocation (arrow A) and the axis of the assembly, this flange 18 lying along the wall of flank 8a of a groove 4. A peripheral outwardly extending lip 12 is formed integrally with flange 18 and overlies the floor 13 of the groove while underlying a clamping ring generally designated 5 and received in the groove 4 to lock the flange 18 and the lip 12 in this groove.

As can be seen clearly in FIG. 2, the flange 18 is formed along its side 18a facing the exposed flange 8 of the groove with a multiplicity of peripherally spaced resiliently compressible protuberances unilaterally molded with the remainder of the sleeve 3. These protuberances, which in their expanded state (FIG. 1) are disposed at a radial distance D from the exposed flank 8, which is less than the width W of the clamping ring 5, are resiliently compressed by the split ring, whose operation is shown at 15 in FIG. 1, and thus bias the ring outwardly against the exposed flank 8.

The ring 5 is of trapezoidal configuration with an inner frustoconical surface 14 including an acute angle α between itself and the surface 16 of the ring 5. This acute angle α forms a relatively sharp edge 7 which is urged radially (arrow B) by the outward forces applied by the protuberances 6 to bite into the free flank 8 and prevent dislodgement of the clamping ring 5 (and the portions of the ring 3 retained thereby in the groove) in the direction of arrow A. The seal is assembled by inserting the flange 18 into the groove 4 and then driving the split ring 5 against the lip 12 and permitting the inherent expansion force of the split ring and the compressed protuberances 6 to drive the ring into biting engagement with the flank 8. The ring 5 is found to be retained without slippage in the groove and to hold both the lip 12 and the flange 18 under compression.

Figure 3:
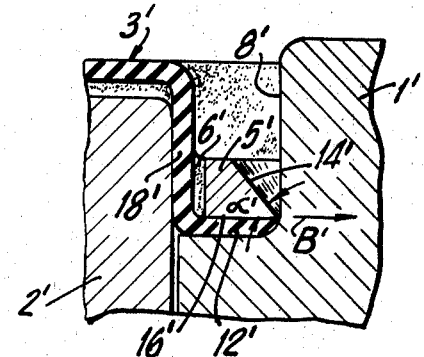
FIG. 3 is a fragmentary cross-section illustrating a modification.

The dust cap 3 includes a web 17 connecting the flange 18 with a U-shaped flange 10 which bears radially inwardlly against the piston 1 and rests against the wall of a peripheral recess 11 of the piston. While the cuff is here shown to be held by its inherent resiliency against the piston 1, it is also possible to make use of a clamping arrangement of the type shown at 5 in FIGURE 2 for this side of the dust sleeve 3 as well. To this end, the piston 1' (FIG. 3) is formed with an axially outwardly open groove 11' in which a flange 18' of the sleeve 3' is held by a clamping ring 5'. The split ring here is drawn radially inwardly by its inherent contractile force and is urged by the protuberances 6' spaced peripherally along the flange 18', into biting engagement with the free flank 8' of the groove 11'. In this embodiment, an inner but reversed frustoconical surface 14' of the ring 5' defines the acute angle α' with the surface 16' resting against a lip 12' and the floor of groove 11'. Thus the protuberances 6' bias the ring 5' radially inwardly (arrow B') to lock the clamping assembly in place.

Figure 4:
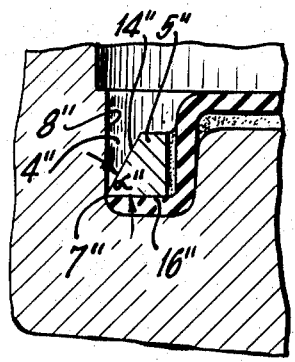
FIG. 4 is a view corresponding to a portion of FIG. 2 illustrating another embodiment of my invention.

In FIG. 4, the ring 5" is shown to have an outer frustoconical surface 14" defining the acute angle α" with surface 16" of the split ring. In this embodiment, the edge 7" bites into the free flank 8" of the groove 4" in the manner described in connection with FIG. 2.

The invention described and illustrated is believed to admit of many modifications within the ability of persons skilled in the art, all such modifications being considered within the spirit and scope of the appended claims.

I claim:
1. A seal assembly comprising:
   a pair of annular bodies to be sealingly bridged, including at least one rigid body forming an outwardly open annular groove having a pair of spaced-apart generally parallel flanks;
   an annular flexible sealing member received in said groove and lying along one of said flanks, said flexible sealing member bridging said bodies; and
   a split clamping ring received in said groove for retaining said sealing member therein, said clamping ring having at least one frustoconical surface forming an annular edge of acute-angle cross-section with another surface of said split ring, said edge bearing against the other of said flanks, said sealing member having a plurality of angularly offset resiliently compressible formations held under radial compression by said ring against said one of said flanks and urging said edge of said clamping ring against said other of said flanks.

2. An assembly as defined in claim 1 wherein said sealing member has an annular flange received in said groove and lying along said one of said flanks, and said formations are protuberances formed integrally with said flank and peripherally spaced therearound.

3. An assembly as defined in claim 2 wherein said rigid body is an element of a pair of telescopingly interengaging elements of a piston-and-cylinder arrangement.

4. An assembly as defined in claim 3 wherein said elements are relatively displaceable in axial direction and said groove opens axially outwardly on said one of said elements, said flange having an annular lip of resiliently compressible material overlying said ring.

5. An assembly as defined in claim 4 wherein said sealing member is a dust cap excluding contaminants from the region between said elements.

References Cited
UNITED STATES PATENTS

| | | | |
|---|---|---|---|
| 2,709,630 | 5/1955 | Patterson | 277—65 |
| 2,853,329 | 9/1958 | Guhman | 277—191 |
| 2,950,499 | 8/1960 | Schlage | 74—18.2 XR |
| 2,977,139 | 3/1961 | Primeau | 277—189 XR |
| 3,052,477 | 9/1962 | Parker | 277—189 |
| 3,065,733 | 11/1962 | Hass | 74—18.2 |
| 3,252,342 | 5/1966 | Collins | 74—18.2 |
| 3,279,832 | 10/1966 | Bergman. | |

FOREIGN PATENTS 792,197  3/1958  Great Britain.

SAMUEL ROTHBERG, Primary Examiner

U.S. Cl. X.R.

74—18.2; 277—212, 207